A. CAMPORINI.
SHOCK ABSORBER.
APPLICATION FILED MAY 7, 1913.
1,078,536.
Patented Nov. 11, 1913.
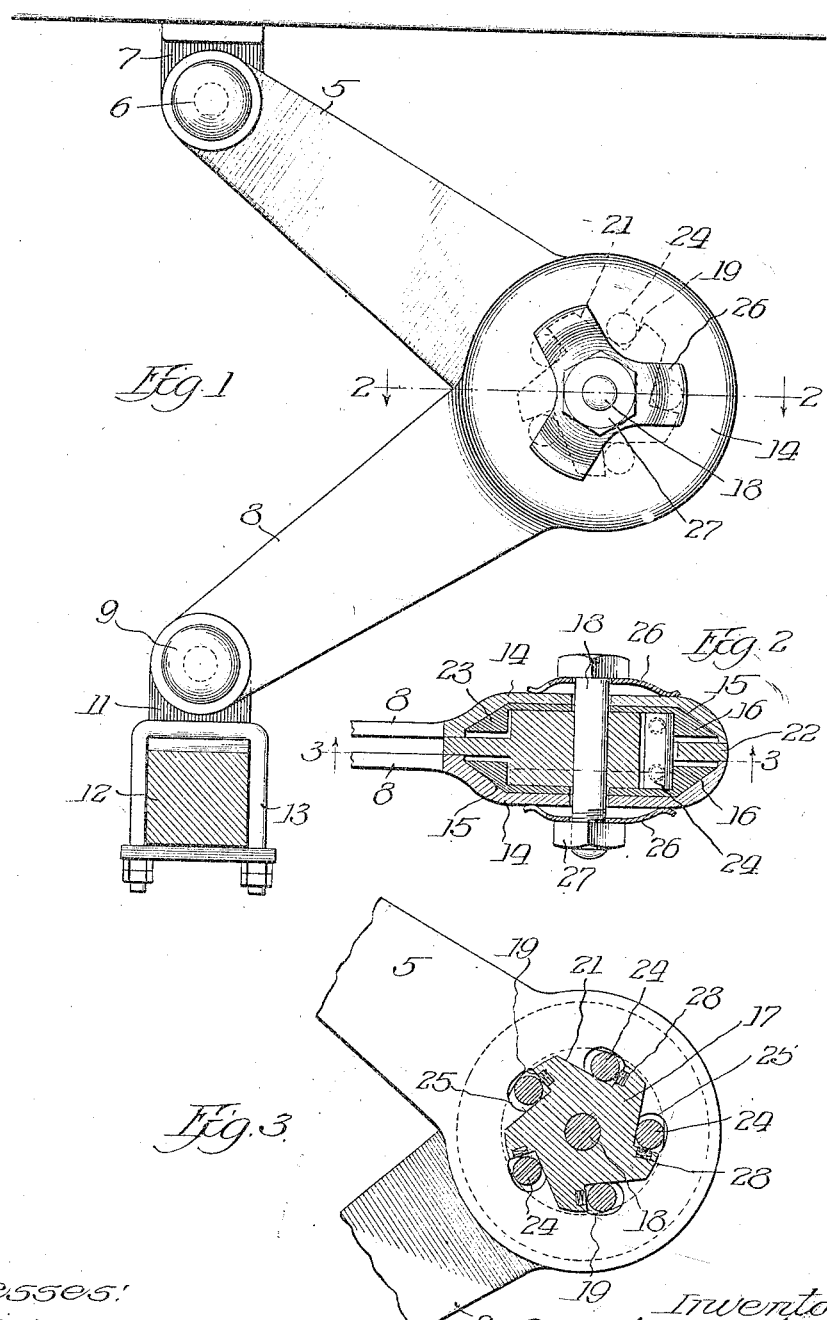

UNITED STATES PATENT OFFICE.

AUGUSTINE CAMPORINI, OF CHICAGO, ILLINOIS.

SHOCK-ABSORBER.

1,078,536.   Specification of Letters Patent.   Patented Nov. 11, 1913.

Application filed May 7, 1913. Serial No. 766,002.

*To all whom it may concern:*

Be it known that I, AUGUSTINE CAMPORINI, a subject of the King of Italy, residing at Chicago, in the county of Cook and State of Illinois, have invented certain new and useful Improvements in Shock-Absorbers, of which the following is a specification.

This invention relates to shock absorbers adapted for use on vehicles, and the like, and aims to provide a device of this character which will be particularly adapted for application to automobiles.

One of the primary objects of the present invention is to provide a shock absorber of simple construction, which will offer but little resistance to the compression of the vehicle springs but will immediately become effective upon upward movement of the springs to prevent undue rebound.

Another object is to provide a shock absorber of such construction that the wear on the various moving parts will be reduced to a minimum and to provide friction means for retarding and decreasing the rebound of the vehicle body, said means being arranged to travel in one direction only and by an intermittent motion.

Other objects are to provide a shock absorber, which will be simple in construction, cheap to manufacture and easy to assemble and, one which will be effective in operation and also strong and durable but, at the same time, as light as is compatible with the strength required.

For the purpose of facilitating the explanation of my present invention, I have shown on the accompanying drawings a preferred embodiment thereof from a consideration of which when taken in connection with the following description the invention will be readily understood.

Referring to the drawings—Figure 1 is a side elevation of a shock absorber embodying my invention; Fig. 2 is a transverse sectional view on the line 2—2 of Fig. 1; and Fig. 3 is vertical sectional view on the line 3—3 of Fig. 2.

On the drawings reference character 5 indicates an arm of the absorber which may be pivotally connected by a bolt 6, or other fastening means, to an ear or bracket 7 attached to the vehicle body or frame in the usual manner. 8 designates a pair of arms spaced apart a distance equal to the thickness of the arm 5 and connected by a bolt 9, or other fastening means, to a stud or ear 11 which may be fastened to the axle 12 of the vehicle by a clip 13, or in any other preferred manner. The arms 8, which are disposed in parallelism with each other, are enlarged at their upper ends to provide a casing comprising the friction members 14 provided with oppositely disposed friction surfaces 15, preferably of concave formation. Coöperating with these friction surfaces is a pair of friction cones 16, the outer faces of which are shaped to conform to and have frictional engagement with the friction surfaces 15 of the friction members.

The arm 5 terminates at its lower end in a head 17 forming, in effect, an oscillatory element adapted to oscillate between the friction cones upon a bolt 18 connecting and holding the various parts in assembled relation. The head 17 is extended laterally in both directions to lie within the friction cones and is provided on its periphery with a series of notches each having a radially disposed wall 19 and an inclined wall or surface 21. The head is also formed to provide a centrally arranged radially extending flange 22 which projects outwardly between the adjacent edges of the friction members 14 to form a substantial closure for the casing. The inner faces of the friction cones 16 are cored or dished to provide annular walls 23 surrounding the laterally projecting portions of the head 17.

The notches in the head 17 are of sufficient depth to accommodate at their deepest end rollers 24 which extend through apertures 25 formed in the flange 22, the apertures being of sufficient size to permit lateral travel of the rollers in the notches. When the axle of the vehicle moves upwardly or the body moves downwardly the head 17 travels relatively to the friction cones in a counter-clockwise direction viewing Fig. 3. The rollers 24 during this movement of the head lie in the deeper ends of the notches and substantially against the vertical walls 19 so that no resistance is ofdered to movement of the head relatively to the cones. Upon reverse movement of the head, however, in a clockwise direction, viewing Fig. 3, the rollers 24 will move along the inclined surfaces of the notches a short distance so that they will be gripped or wedged between the surfaces 21 of the head and walls 23 of the cones, thereby forming a rigid connection between the head and the cones which causes the cones to travel with the head. Frictional resistance to this movement is afforded by the frictional contact between the outer walls of the cones and the inner walls of the friction members 14.

It will thus be apparent that the absorber is effective only upon rebound and that practically no resistance is offered to the downward movement of the vehicle body but that the upward movement is resisted by the friction between the friction cones and the friction members. The amount of this friction may be regulated by the springs 26 surrounding the ends of the bolt 18 and pressing against the friction members, the pressure of these springs being adjusted by tightening or loosening the nut 27 on the bolt. In order to insure slight movement of the rollers 24, which is necessary to effect the connection between the head 17 and the friction cones, I prefer to employ suitable expansion springs 28 which are disposed in sockets in the vertical walls 19 and yieldingly urge the rollers 24 along the inclined surfaces 21. While these springs are not essential if the parts are accurately constructed, nevertheless, they may be employed as a precautionary measure to insure proper and immediate action of the device. In actual practice the walls of the friction members 14 are spaced slightly from the flanges 22 so that these members may be clamped together to provide the requisite friction against the friction cones.

It is believed that my invention will be understood from the foregoing without further description and it will be obvious that various changes in the structure of the mechanical details disclosed may be resorted to without departing from the spirit of the invention.

It will, also, be manifest that I have provided a shock absorber which is of simple construction and very durable and that the wearing of the parts is reduced to a minimum by reason of the fact that the friction cones are adapted to travel only in one direction so that the point of contact between the rollers 24 and the walls 23 in changed at each operation and, also, by reason of the fact that the rollers 24 rotate slightly at each operation so that new wearing surfaces are continually presented.

I claim:

1. In a shock absorber, the combination of a pair of oppositely disposed friction members, a pair of friction cones arranged to frictionally engage said members, an element disposed between said friction cones and arranged concentrically therewith, said element being provided with a plurality of inclined surfaces and a centrally disposed peripheral flange projecting between the adjacent edges of said friction members, rollers carried by said central element in coöperative relation with said inclined surfaces, and means for yieldingly urging said rollers into position to establish a frictional connection between said surfaces and said cones.

2. In a shock absorber, the combination of a pair of parallel arms terminating in oppositely disposed friction surfaces, a central arm terminating in a head located between and concentrically with said friction surfaces, friction devices interposed between the ends of said head and said friction surfaces, said devices having external friction faces engaging with said friction surfaces and inner walls surrounding the ends of said head, said head being provided with a plurality of inclined surfaces opposed to said inner walls of the friction devices, and rollers carried by said head in coöperative relation with said inclined surfaces to establish a frictional connection between said head and said frictional devices.

3. In a shock absorber, the combination of a pair of oppositely disposed friction members, friction cones arranged to frictionally engage said members, an element disposed between said cones and concentrically therewith, said element being provided with a plurality of inclined surfaces, rollers carried by said element in coöperative relation with said inclined surfaces, and means for yieldingly urging said rollers into position to establish a frictional connection between said surfaces and said cones.

4. In a shock absorber, the combination of a pair of oppositely disposed friction members, friction cones arranged to frictionally engage said members, an element disposed between said friction cones and pivoted concentrically with said cones and friction members, said element being provided with a plurality of inclined surfaces and centrally disposed peripheral flanges projecting radially between the adjacent edges of said friction members, and rollers carried by said central element in coöperative relation with said inclined surfaces to establish a frictional connection between said surfaces and said cones.

5. In a shock absorber, the combination of a pair of oppositely disposed friction members, a pair of friction cones arranged to frictionally engage said members, an element disposed between said friction cones and arranged concentrically therewith, said element being provided with a plurality of inclined surfaces, and rollers carried by said central element in coöperative relation with said inclined surfaces to establish a frictional connection between said surfaces and said cones.

AUGUSTINE CAMPORINI.

Witnesses:
IRA J. WILSON,
FRANKLIN W. WARDEN.